(12) United States Patent
Chu

(10) Patent No.: US 6,873,249 B2
(45) Date of Patent: Mar. 29, 2005

(54) LUMINOUS ALARM DEVICE

(76) Inventor: Wu-Lung Chu, 235 Chung-Ho Box 8-24, Taipei (TW)

(*) Notice: Subject to any disclaimer, the term of this patent is extended or adjusted under 35 U.S.C. 154(b) by 98 days.

(21) Appl. No.: 10/331,970

(22) Filed: Dec. 31, 2002

(65) Prior Publication Data
US 2004/0124997 A1 Jul. 1, 2004

(51) Int. Cl.⁷ ................................................ G08B 5/00
(52) U.S. Cl. ....................... 340/332; 340/907; 340/908; 362/800; 116/63 P; 116/63 R
(58) Field of Search ............................... 340/332, 908, 340/908.1, 321, 468, 907; 362/800, 428; 116/63 R, 63 P

(56) References Cited

U.S. PATENT DOCUMENTS 5,319,365 A * 6/1994 Hillinger ................. 340/908.1
5,684,452 A * 11/1997 Wang ......................... 340/321
6,265,969 B1 * 7/2001 Shih ........................... 340/468

* cited by examiner

Primary Examiner—Jeffery Hofsass
Assistant Examiner—Eric Blount
(74) Attorney, Agent, or Firm—Alan D. Kamrath; Nikolai & Mersereau, P.A.

(57) ABSTRACT

A luminous alarm device comprises an illumination body, a plurality of legs, a sliding ring, a positioning toggle, and a retaining seat. One end of the leg is formed with a first buckle and another end thereof has a rib. A distal end of the rib is extended with a second buckle. The rib bends with respect to the leg. The sliding ring is mounted at an upper edge of the cylinder. A sliding ring is slidable along the cylinder. A plurality of first slots are installed at the sliding ring for buckling the first buckles. The retaining seat is firmly secured to the cylinder. An inner wall of the retaining seat is formed with a plurality of second slots for buckling the second buckles. When the sliding ring slides along the cylinder, the legs will be folded or expanded so as to use or store the luminous alarm device.

6 Claims, 5 Drawing Sheets

LUMINOUS ALARM DEVICE

FIELD OF THE INVENTION

The present invention relates to alarm devices, and particularly to a luminous alarm device which provides an alarm device having an illumination function.

BACKGROUND OF THE INVENTION

In general, an alarm device of a car is a triangular plate which is stand on a road to alert other drivers not to near a destroyed car. In some designs, the triangular plate is adhered with a light reflecting paper. However, it's effect is insufficient at night since the reflecting light is too weak to alert the user. In some design, some complicated structure is developed as an alarm plate for alert the driver, but the structure is complicated and must be assembled with a complex operation with more time being necessary. Moreover, to store the alarm plate is also another trouble to the user.

SUMMARY OF THE INVENTION

Accordingly, the primary object of the present invention is to provide a luminous alarm device comprises an illumination body, a plurality of legs, a sliding ring, a positioning toggle, and a retaining seat. One end of the leg is formed with a first buckle and another end thereof has a rib at a middle section thereof. A distal end of the rib is extended with a second buckle. The rib bends with respect to the leg with a larger angle. The sliding ring is mounted at an upper edge of the cylinder. A sliding ring is slidable along the cylinder. A plurality of first slots are installed at an inner wall of the sliding ring for buckling the first buckles of the legs. The retaining seat is firmly secured to a lower end of the cylinder. An inner wall of the retaining seat is formed with a plurality of second slots for buckling the second buckles of the legs. Thereby, by above components, when the sliding ring slides along the cylinder, the legs will be folded or expanded so as to use or store the luminous alarm device.

The various objects and advantages of the present invention will be more readily understood from the following detailed description when read in conjunction with the appended drawing.

DETAILED DESCRIPTION OF THE PREFERRED EMBODIMENTS

Figure 1:
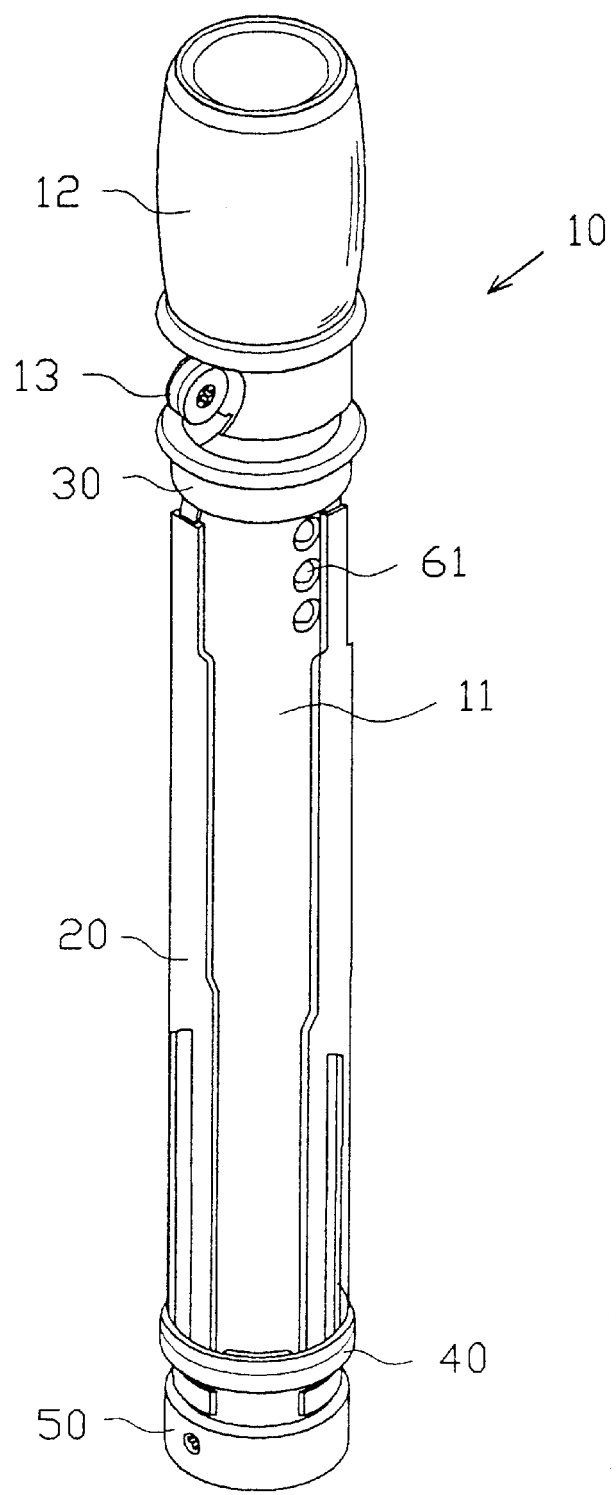
FIG. 1 is an assembled schematic view of the present invention.
Figure 2:
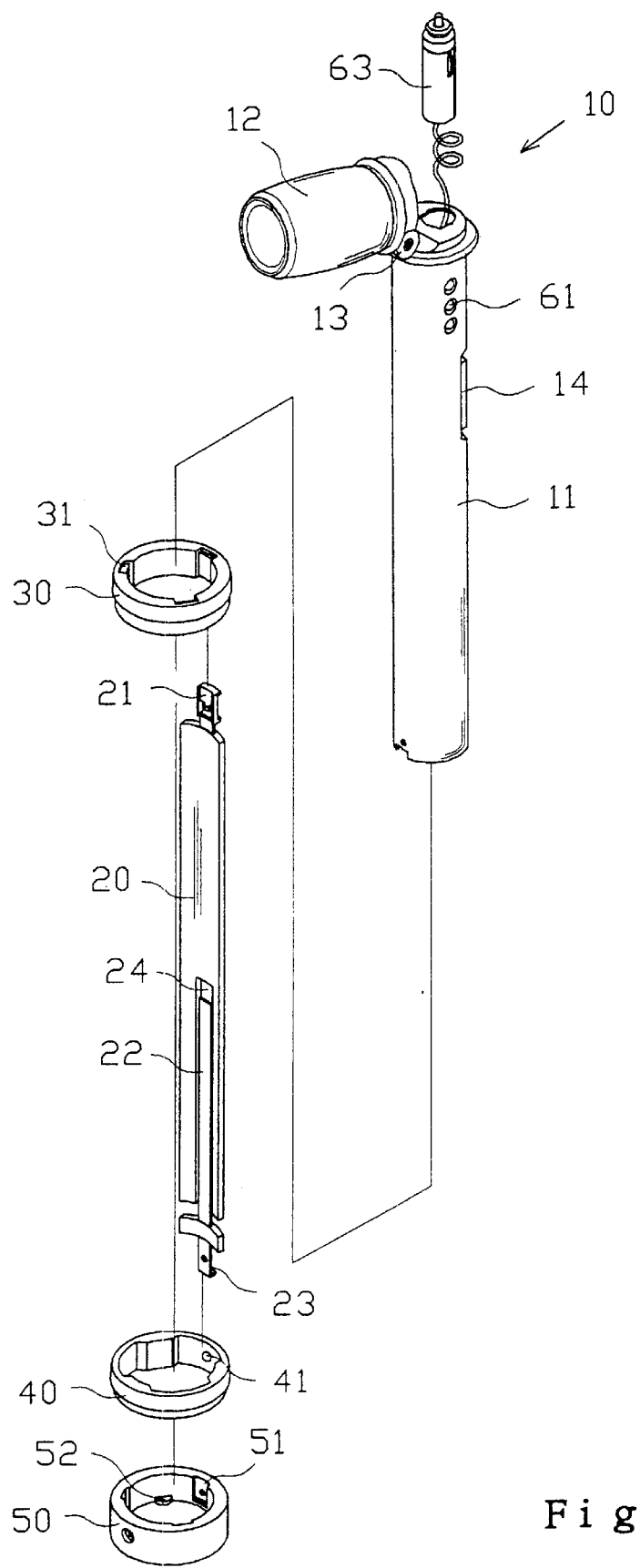
FIG. 2 is an exploded schematic view of the present invention.
Figure 3:
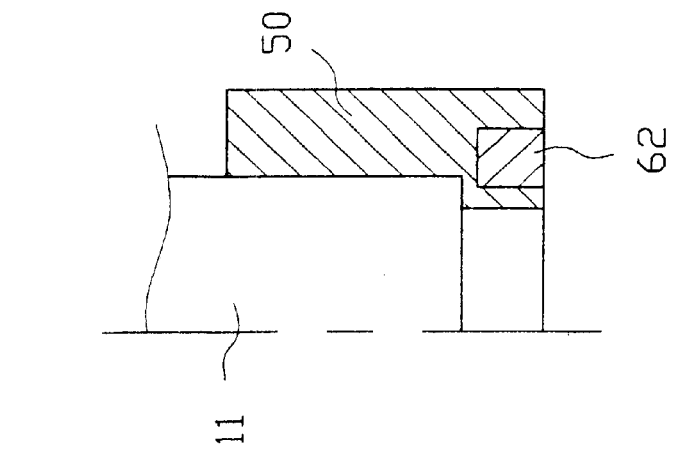
FIG. 3 is a partial cross sectional view of the present invention before it is used.
Figure 4:
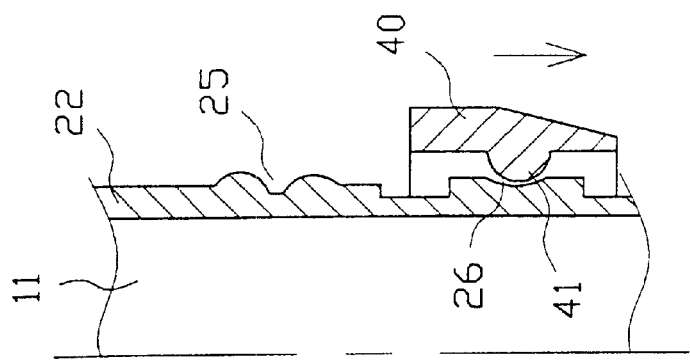
FIG. 4 is a partial cross sectional view of the present invention after it is used.
Figure 5:
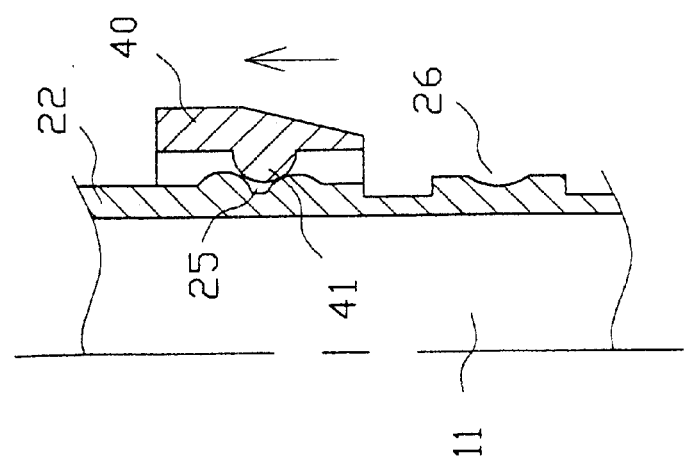
FIG. 5 is a partial schematic cross sectional view of the present invention.

Referring to FIGS. 1 to 5, the luminous alarm device of the present invention is illustrated. The luminous alarm device 10 includes an illumination body 11, a plurality of legs 20, a sliding ring 30, a positioning toggle 40, and a retaining seat 50.

The illumination body 11 is formed by a cylinder 11 and a lamp seat 12. The lamp seat 12 is installed at an upper edge of the cylinder 11. A pivotal portion 13 serves to connect the cylinder with the lamp seat. The lamp seat 12 can rotate around the cylinder 11 through 180 degrees. Moreover, an inner side of the cylinder 11 is installed with a circuit board, a charger (not shown), etc. An outer side of the cylinder 11 is embedded with a plurality of LEDs 61. The lamp seat 12 is installed with a bulb and a plurality of LEDs (not shown). A switch 14 for controlling the bulb and LEDs is installed at an outer side of the cylinder 11.

Each leg 20 is formed as a thin sheet. One end of the leg 20 is formed with a first buckle 21 and another end thereof has a rib 22 at a middle section thereof. A distal end of the rib 22 is extended with a second buckle 23. A flexible bendable piece 24 is used to connect the rib 22 with the leg 20. The rib 22 can bend with respect to the leg 20 with a larger angle. Furthermore, near a distal end of the rib 22 of the leg 20 is formed with a first positioning portion 25 and a second positioning portion 26. The first positioning portion is formed by two adjacent protrusions of different heights. The second positioning portion is formed by a concave portion on the rib 22.

The sliding ring 30 is mounted at an upper edge of the cylinder 11. The sliding ring 30 is slidable along the cylinder 11. A plurality of first slots 31 are installed at an inner wall of the sliding ring 30 for buckling the first buckles 21 of the legs 20.

The positioning toggle 40 encloses a distal end of the periphery of the legs 20. The inner wall of the positioning toggle 40 has a plurality of protrusions 41 with respect to the ribs 22 of the legs 20.

The retaining seat 50 is firmly secured to a lower end of the cylinder 11. An inner wall of the retaining seat 50 is formed with a plurality of second slots 51 for buckling the second buckles 23 of the legs 20. A plurality of magnetic bodies are installed at a bottom of the retaining seat 50 for positioning the luminous device.

Thereby, by above components, when the sliding ring 30 slides along the cylinder 11, the legs 20 will be folded or expanded so as to use or store the luminous alarm device.

Figure 6:
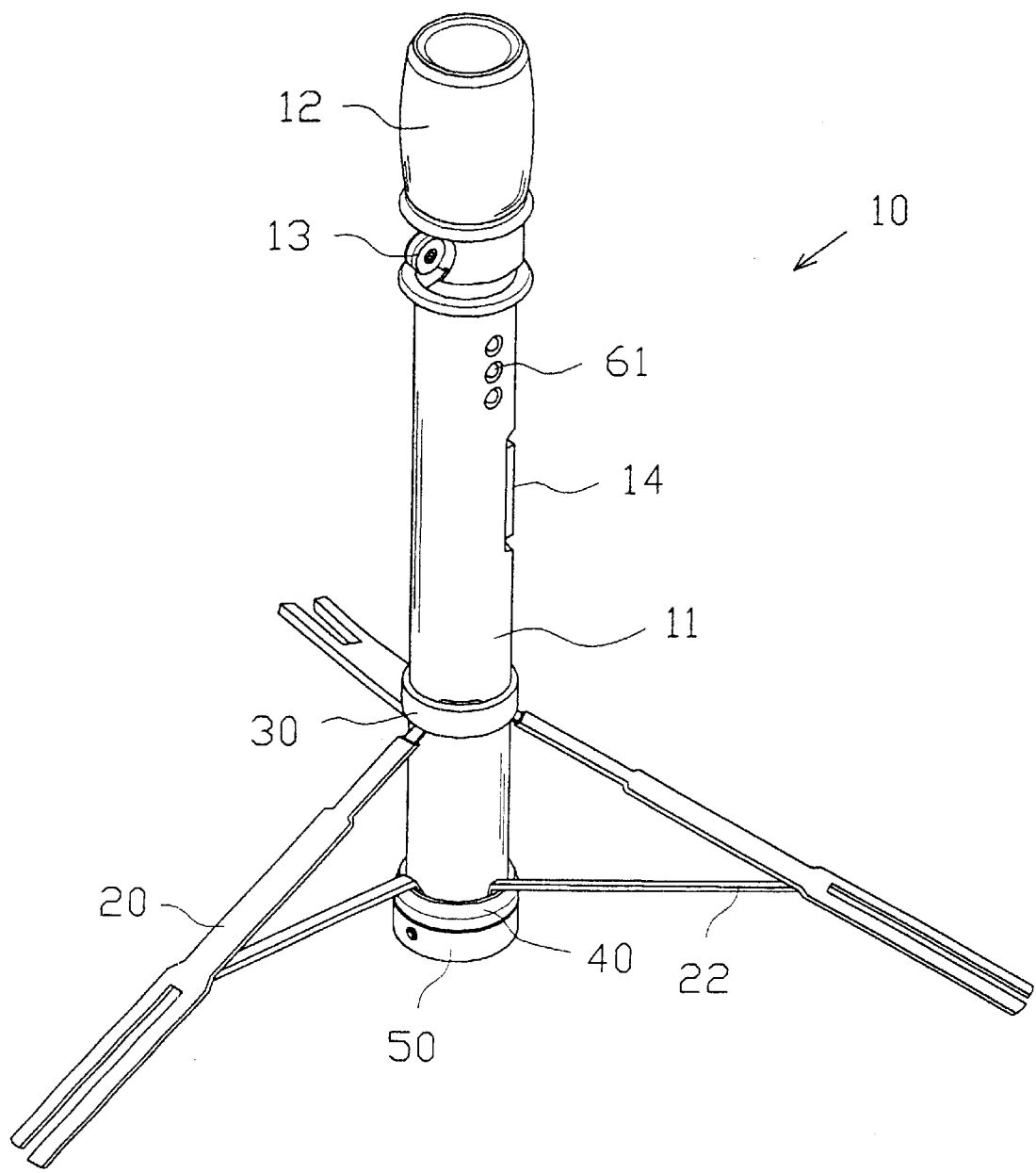
FIG. 6 is a schematic view showing the application of the present invention.
Figure 7:
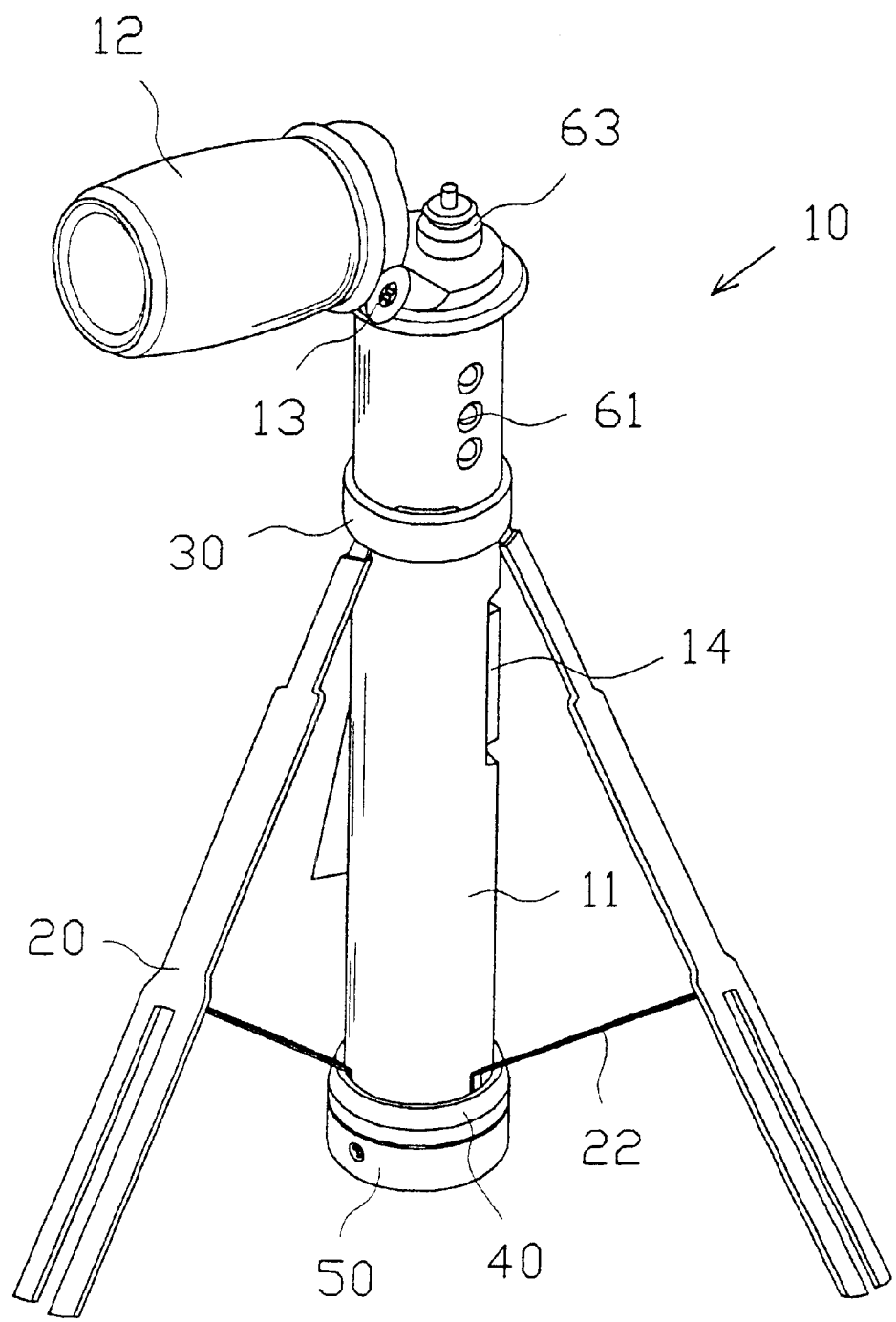
FIG. 7 is a schematic view showing another application of the present invention.

The use of the present invention will be described here with referring to FIGS. 1, 5, 6 and 7. When the present invention is not used, the legs 20 are adhered to be out of the cylinder 11. At the same time, the protrusions 41 of the positioning toggle 40 resists against and positioned to the positioning portions 25 of the legs 20 (referring to FIG. 3). When it is desired to use the present invention, the positioning toggle 40 moves downwards so that the protrusions 41 are buckled to the second positioning portion (referring to FIG. 4). Then the sliding ring 30 moves downwards to drive the legs 20 to expand as the operation of an umbrella. Thereby, the legs 20 stand on the ground.

It should be further described that the present invention can be used with a charger plug 63. In use, the charger plug 63 is plugged to a top side of the cylinder 11. When the charger plug 63 is not used, it is hidden in the lamp seat 12. In use, the lamp seat 12 is uncovered for taking out the charger plug 63 to combine with the receptacle of a car.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A luminous alarm device comprising an illumination body, a plurality of legs, a sliding ring, a positioning toggle, and a retaining seat; wherein:

the illumination body is formed by a cylinder and a lamp seat; the lamp seat is installed at an upper edge of the cylinder; a pivotal portion serves to connect the cylinder with the lamp seat; the lamp seat rotates around the cylinder through 180 degrees;

each leg is formed as a thin sheet; one end of the leg is formed with a first buckle and another end thereof has a rib at a middle section thereof; a distal end of the rib is extended with a second buckle; a flexible bendable piece is used to connect the rib with the leg; the rib bends with respect to the leg with a larger angle;

the sliding ring is mounted at an upper edge of the cylinder; a sliding ring is slidable along the cylinder; a plurality of first slots are installed at an inner wall of the sliding ring for buckling the first buckles of the legs;

the retaining seat is firmly secured to a lower end of the cylinder; an inner wall of the retaining seat is formed with a plurality of second slots for buckling the second buckles of the legs;

wherein thereby, by above components, when the sliding ring slides along the cylinder, the legs will be folded or expanded so as to use or store the luminous alarm device.

2. The luminous alarm device as claimed in claim 1, wherein the lamp seat is installed with a bulb and a plurality of LEDs; a switch for controlling the bulb and LEDs is installed at an outer side of the cylinder.

3. The luminous alarm device as claimed in claim 1, further comprising a charger plug, the charger plug is plugged to a top side of the cylinder; when the charger plug is not used, it is hidden in the lamp seat.

4. The luminous alarm device as claimed in claim 2, further comprising a charger plug, the charger plug is plugged to a top side of the cylinder; when the charger plug is not used, it is hidden in the lamp seat.

5. The luminous alarm device as claimed in claim 1, further comprising a positioning toggle enclosing around distal ends of the peripherys of the legs; an inner wall of the positioning toggle has a plurality of protrusions with respect to the ribs of the legs; near a distal end of the rib of the leg is formed with a first positioning portion and a second positioning portion; the first positioning portion is formed by two adjacent protrusions of different heights; the second positioning portion is formed by a concave portion on the rib;

when it is desired to store the legs, the positioning toggle encloses the legs; and the protrusions of the positioning toggle resist against and is positioned to the positioning portions of the legs; when it is desired to expand the legs, the protrusions of the positioning toggle are positioned therein.

6. The luminous alarm device as claimed in claim 1, wherein a plurality of magnetic bodies are installed at a bottom of the retaining seat for positioning the luminous device.

* * * * *